(12) United States Patent
Jiang

(10) Patent No.: US 11,863,587 B2
(45) Date of Patent: Jan. 2, 2024

(54) WEBSHELL DETECTION METHOD AND APPARATUS

(71) Applicant: HUAWEI TECHNOLOGIES CO., LTD., Guangdong (CN)

(72) Inventor: Wu Jiang, Beijing (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 381 days.

(21) Appl. No.: 16/440,795

(22) Filed: Jun. 13, 2019

(65) Prior Publication Data

US 2019/0334948 A1 Oct. 31, 2019

Related U.S. Application Data

(63) Continuation of application No. PCT/CN2017/096502, filed on Aug. 8, 2017.

(30) Foreign Application Priority Data

Dec. 16, 2016 (CN) .......................... 201611167905.3

(51) Int. Cl.
*H04L 9/40* (2022.01)
*H04L 69/22* (2022.01)

(52) U.S. Cl.
CPC ...... *H04L 63/1483* (2013.01); *H04L 63/0236* (2013.01); *H04L 63/1425* (2013.01); *H04L 63/20* (2013.01); *H04L 69/22* (2013.01)

(58) Field of Classification Search
CPC ............. H04L 63/1483; H04L 63/0236; H04L 63/1425; H04L 63/20; H04L 69/22; H04L 67/02; H04L 63/1441; H04L 29/06; H04L 63/1416

See application file for complete search history.

(56) References Cited

U.S. PATENT DOCUMENTS

2008/0276316 A1* 11/2008 Roelker .............. H04L 63/1408
726/23
2015/0256551 A1 9/2015 Kang
2017/0366576 A1* 12/2017 Donahue ............. H04L 63/0236

FOREIGN PATENT DOCUMENTS

| CN | 102609341 A | 7/2012 |
| CN | 103701793 A | 4/2014 |
| CN | 104468477 A | 3/2015 |
| CN | 104618343 A | 5/2015 |

(Continued)

*Primary Examiner* — Shewaye Gelagay
*Assistant Examiner* — Carlton Johnson
(74) *Attorney, Agent, or Firm* — WOMBLE BOND DICKINSON (US) LLP

(57) ABSTRACT

A webshell detection method and apparatus are provided. The apparatus obtains first web traffic of a protected host; generates a web page visit record of the protected host based on the first web traffic, where the web page visit record is used to save at least one uniform resource locator (URL), an IP address visiting each URL, and a total quantity of visits to each URL; determines a suspicious URL from the at least one URL based on the web page visit record, where a total quantity of visits to the suspicious URL is less than a first threshold, and a ratio of a quantity of different IP addresses visiting the suspicious URL to the total quantity of visits to the suspicious URL is less than a second threshold; and determines whether a web page identified by the suspicious URL contains a webshell signature.

17 Claims, 11 Drawing Sheets

(56) References Cited

FOREIGN PATENT DOCUMENTS

| | | | |
|---|---|---|---|
| CN | 105187396 | A | 12/2015 |
| CN | 105553974 | A | 5/2016 |
| CN | 105760379 | A | 7/2016 |

* cited by examiner

WEBSHELL DETECTION METHOD AND APPARATUS

CROSS-REFERENCE TO RELATED APPLICATIONS

This application is a continuation of International Application No. PCT/CN2017/096502, filed on Aug. 8, 2017, which claims priority to Chinese Patent Application No. 201611167905.3, filed on Dec. 16, 2016. The disclosures of the aforementioned applications are hereby incorporated by reference in their entireties.

TECHNICAL FIELD

The present invention relates to the field of cybersecurity technologies, and in particular, to a webshell detection method and a webshell detection apparatus.

BACKGROUND

A webshell (webshell) is a backdoor tool existing in a form of a web page file. By using a webshell, permission for operations on a website, for example, file uploading/downloading, database viewing, and script command execution, can be obtained. A webshell file may be a web page file written using the active server page (ASP) application, or a web page file written using the hypertext preprocessor (PHP) language, or a common gateway interface (CGI) program file.

A host that provides a web page service and opens a port related to a web page service in a network is also referred to as a website server or a web server. Website servers tend to be targets of webshell attacks. After successfully invading a website server by exploiting a vulnerability such as an open port, an attacker stores a webshell file in a web page directory of the website server, to mix it with normal web page files. Then, the attacker can use a browser to visit the webshell file stored in the website server to gain permission to perform operations on the website server, so as to achieve illegal purposes such as controlling the website server and stealing information. Data is usually transmitted between the attacker and the attacked website server through a default web page service port 80, and a firewall usually does not prevent Hypertext Transfer Protocol (HTTP) traffic visiting the port 80 in order not to affect normal web page visit behavior of web users. Therefore, a simple packet filtering approach cannot prevent the foregoing attack behavior.

In the prior art, for detection of webshells, code of webshell files or traffic generated when attackers visit webshell files is manually analyzed to obtain signatures of the webshells and form a webshell signature database. After obtaining web traffic, a security device matches the web traffic against the signatures in the webshell signature database, to implement webshell detection. However, as web traffic is of a huge data volume in an existing network, a large quantity of processing resources of the security device are consumed. As a result, detection efficiency is relatively low.

SUMMARY

Embodiments of this application provide a webshell detection method to address low detection efficiency.

According to a first aspect, a webshell detection method is provided, including: obtaining first web traffic of a protected host, where the first web traffic is traffic generated when a web page provided by the protected host is visited during a first period; generating a web page visit record of the protected host based on the first web traffic, where the web page visit record is used to save at least one uniform resource locator (URL), an IP address visiting each of the at least one URL, and a total quantity of visits to each URL, and each URL identifies one web page provided by the protected host; determining a suspicious URL from the at least one URL based on the web page visit record, where a total quantity of visits to the suspicious URL is less than a first threshold, and a ratio of a quantity of different IP addresses visiting the suspicious URL to the total quantity of visits to the suspicious URL is less than a second threshold; and determining whether a web page identified by the suspicious URL contains a webshell signature in a webshell signature database, and detecting, based on a webshell signature determining result, whether a webshell exists in the web page identified by the suspicious URL.

According to this first aspect, a web page visit record able to reflect a quantity of visits to each web page of the protected host, distribution of visitor IP addresses, and other statuses is constructed based on generated web traffic of the protected host. Further, a relatively highly suspicious URL is identified, based on the web page visit record, from a plurality of web page URLs provided by the protected host, and afterwards detection is focused on a web page identified by the suspicious URL, without a need to perform webshell detection on all the web pages. According to the foregoing method, a quantity of web pages on which webshell detection needs to be performed is reduced, thereby improving web inspection performance.

Optionally, a first specific structure is provided for the web page visit record and detailed steps how the web page visit record is constructed. The suspicious URL can be determined rapidly by using a web page visit record of this structure. To be specific, in a first possible implementation of the first aspect, the web page visit record includes at least one entry, each of the at least one entry is corresponding to one of the at least one URL, and each entry saves a total quantity of visits and an IP address list; and the generating a web page visit record of the protected host based on the first web traffic includes:

obtaining at least one access request packet from the first web traffic, where a destination IP address of the access request packet is an IP address of the protected host;

selecting one access request packet from the at least one access request packet, and performing the following processing on the selected access request packet, until each of the at least one access request packet is processed:

parsing the selected access request packet to obtain a source IP address of and a URL carried in the selected access request packet;

searching the web page visit record for an entry corresponding to the URL carried in the selected access request packet; and if the entry corresponding to the URL carried in the selected access request packet is found, adding 1 to a total quantity of visits in the found entry, and recording the source IP address into an IP address list in the found entry; or if the entry corresponding to the URL carried in the selected access request packet is not found, creating, in the web page visit record, the entry corresponding to the URL carried in the selected access request packet, setting a total quantity of visits in the created entry to 1, and recording the source IP address into the IP address list in the created entry.

With reference to a first implementation of the first aspect, in a second implementation of the first aspect, the determining a suspicious URL from the at least one URL based on the web page visit record includes:

selecting one entry from the web page visit record;

determining a quantity of IP addresses different from one another in an IP address list in the selected entry; and if a total quantity of visits in the selected entry is less than the first threshold, and a ratio of the determined quantity of IP addresses different from one another to the total quantity of visits in the selected entry is less than the second threshold, determining a URL corresponding to the selected entry as the suspicious URL.

Optionally, a second specific structure is provided for the web page visit record and detailed steps how the web page visit record is constructed. On the basis of an entry in the first specific structure, in the second specific structure, information about an IP address count is added. The suspicious URL can be determined rapidly by using a web page visit record of this structure. To be specific, in a third possible implementation of the first aspect, the web page visit record includes at least one entry, each of the at least one entry is corresponding to one of the at least one URL, and the entry saves a total quantity of visits, an IP address count, and an IP address list; and the generating a web page visit record of the protected host based on the first web traffic includes:

obtaining at least one access request packet from the first web traffic, where a destination IP address of the access request packet is an IP address of the protected host; and selecting one access request packet from the at least one access request packet, and performing the following processing on the selected access request packet, until each of the at least one access request packet is processed:

obtaining a source IP address of and a URL carried in the selected access request packet;

searching the web page visit record for an entry corresponding to the URL carried in the selected access request packet; and if the entry corresponding to the URL carried in the selected access request packet is found, adding 1 to a total quantity of visits in the found entry; determining whether the source IP address has been saved in an IP address list in the found entry; and if the source IP address has been saved in the IP address list in the found entry, ending processing the selected access request packet; or if the source IP address has not been saved in the IP address list in the found entry, adding 1 to an IP address count in the found entry, and recording the source IP address into an IP address list in the found entry; or if the entry corresponding to the URL carried in the selected access request packet is not found, creating, in the web page visit record, the entry corresponding to the URL carried in the access request packet, setting a total quantity of visits in the created entry to 1, setting an IP address count in the created entry to 1, and recording the source IP address into an IP address list in the created entry.

With reference to a third implementation of the first aspect, in a fourth implementation of the first aspect, the determining a suspicious URL from the at least one URL based on the web page visit record includes:

selecting one entry from the web page visit record; and if a total quantity of visits in the selected entry is less than the first threshold, and a ratio of an IP address count in the selected entry to the total quantity of visits in the selected entry is less than the second threshold, determining a URL corresponding to the selected entry as the suspicious URL.

When a terminal visits a web page by using a browser, it is possible that this visit process is not successful. Recording an entry corresponding to a page failing to be visited occupies storage space, and later detection on the page failing to be visited also wastes processing resources. To save storage resources and processing resources, a possible implementation is to record only an entry corresponding to a page to which a visit succeeds. Details are as follows.

With reference to the first or the third possible implementation of the first aspect, in a fifth implementation of the first aspect, the obtaining at least one access request packet from the first web traffic includes:

selecting at least one access response packet from the first web traffic, where a status code carried in each of the at least one access response packet indicates a successful visit, and a source address of each access response packet is the IP address of the protected host; and obtaining an access request packet corresponding to each of the at least one web page access response packet from the first web traffic, as the obtained at least one access request packet.

When terminals visit, by using installed browsers, the web pages provided by the protected host, due to differences in browser providers and browser versions, it is possible that a plurality of access request packets generated when different browsers visit a same web page provided by the website server carry different URLs. If a security device generates, based on this, entries corresponding to the different URLs, such processing does not conform to the fact that these access request packets actually visit a same web page, causing an error in subsequent identification of a suspicious URL, and also leads to an excessively large data volume of the web page visit record. To improve accuracy in identification of the suspicious URL and reduce storage space occupied by the web page visit record in a memory, the security device may perform normalization processing on the URLs in the access request packets before generating an entry in the web page visit record, and then generate an entry based on a normalization-processed URL. Details are as follows.

With reference to the first or the third implementation of the first aspect, in a sixth implementation of the first aspect, the searching the web page visit record for an entry corresponding to the URL carried in the selected access request packet includes:

performing at least one type of normalization processing on the URL carried in the selected access request packet, to obtain a normalization-processed URL, where the normalization processing includes one or more of the following (1) to (3): (1) converting the URL carried in the selected access request packet into a predetermined code scheme; (2) converting characters in the URL carried in the selected access request packet into a predetermined uppercase/lowercase type; and (3) removing a parameter in the URL carried in the selected access request packet;

searching the web page visit record for an entry corresponding to the normalization-processed URL; and correspondingly, the creating, in the web page visit record, the entry corresponding to the URL carried in the access request packet is specifically:

creating, in the web page visit record, the entry corresponding to the normalization-processed URL.

To further reduce storage resources occupied by the web page visit record, information recorded in the web page visit record may be further reduced by deleting some information less helpful for identification of the suspicious URL. For example, after a normal URL is identified, a total quantity of visits and an IP address visiting the normal URL in an entry corresponding to the normal URL may be deleted and no longer be maintained, thereby saving storage resources and reducing processing resources consumed by subsequent entry updates. To be specific, in a seventh possible implementation of the first aspect, the method further includes:

determining a normal URL from the at least one URL based on the web page visit record, where the normal URL is a URL whose total quantity of visits is greater than the first threshold in the at least one URL or a suspicious URL for which a webshell detection result indicates that no webshell exists in an identified web page; and deleting an IP address visiting the normal URL and a total quantity of visits to the normal URL that are saved in the web page visit record.

With reference to a seventh implementation of the first aspect, in an eighth possible implementation of the first aspect, the method further includes:

obtaining second web traffic of the protected host, where the second web traffic is traffic generated when the web page provided by the protected host is visited during a second period after the first period;

obtaining a first access request packet, a second access request packet, and a third access request packet from the second web traffic;

parsing the first access request packet to obtain a source IP address of and a URL carried in the first access request packet; and if the URL carried in the first access request packet is different from the normal URL, and the URL carried in the first access request packet has been saved in the web page visit record, adding 1 to a total quantity of visits to the saved URL carried in the first access request packet, and adding the source IP address of the first access request packet to an IP address visiting the URL carried in the first access request packet;

parsing the second access request packet to obtain a source IP address of and a URL carried in the second access request packet; and if the URL carried in the second access request packet is different from the normal URL, and the URL carried in the second access request packet has not been saved in the web page visit record, saving the URL carried in the second access request packet into the web page visit record, setting a total quantity of visits to the URL carried in the second access request packet to 1, and setting an IP address visiting the URL carried in the second access request packet to the source IP address of the second access request packet; and parsing the third access request packet to obtain a URL carried in the third access request packet; and if the URL carried in the third access request packet is the same as the normal URL, ending processing the third access request packet.

According to a second aspect, a webshell detection apparatus is provided, where the apparatus has a function of implementing the method according to the first aspect or any possible implementation of the foregoing aspect. The function may be implemented by hardware, or may be implemented by hardware executing corresponding software. The hardware or the software includes one or more modules corresponding to the foregoing function.

According to a third aspect, an embodiment provides a computer storage medium, configured to store a computer software instruction for use by the foregoing webshell detection apparatus, where the computer software instruction includes a program designed for executing the first aspect or any possible implementation of the foregoing aspect.

BRIEF DESCRIPTION OF DRAWINGS

The accompanying drawings in the following description describe embodiments of the present invention.

DESCRIPTION OF EMBODIMENTS

With reference to the accompanying drawings, the following describes in detail implementation principles, specific implementations, and benefits of the technical solutions of the present invention.

A series of exchanged packets generated between a browser and a website server by an action that a terminal uses a browser to visit a web page are referred to as web traffic. As information explodes on a network, the website server tends to store millions of web page files, and terminal users frequently visit web pages, causing a rapid growth of web traffic. Restricted by performance, an existing security device, for example, a firewall or deep packet inspection (DPI), finds it difficult to inspect all web page data carried in received web traffic one by one. This becomes one of challenges to existing web security technologies.

One main reason why existing web inspection performance is not high is a huge quantity of to-be-inspected web pages. In view of this, the embodiments described herein provide a webshell detection method. According to the method, a web page visit record able to reflect a quantity of visits to each web page of a protected host, distribution of visitor IP addresses, and other statuses is constructed based on generated web traffic of the protected host. Further, a relatively highly suspicious uniform resource locator (URL) is identified, based on the web page visit record, from URLs of all web pages provided by the protected host, and afterwards detection is focused on a web page identified by the suspicious URL, without a need to perform webshell detection on all the web pages. According to this method, a quantity of to-be-inspected web pages is reduced, and therefore web inspection performance is improved.

The following describes in detail implementation principles, specific implementations, and benefits of the technical solutions provided in the disclosed embodiments with reference to the accompanying drawings.

Figure 1:
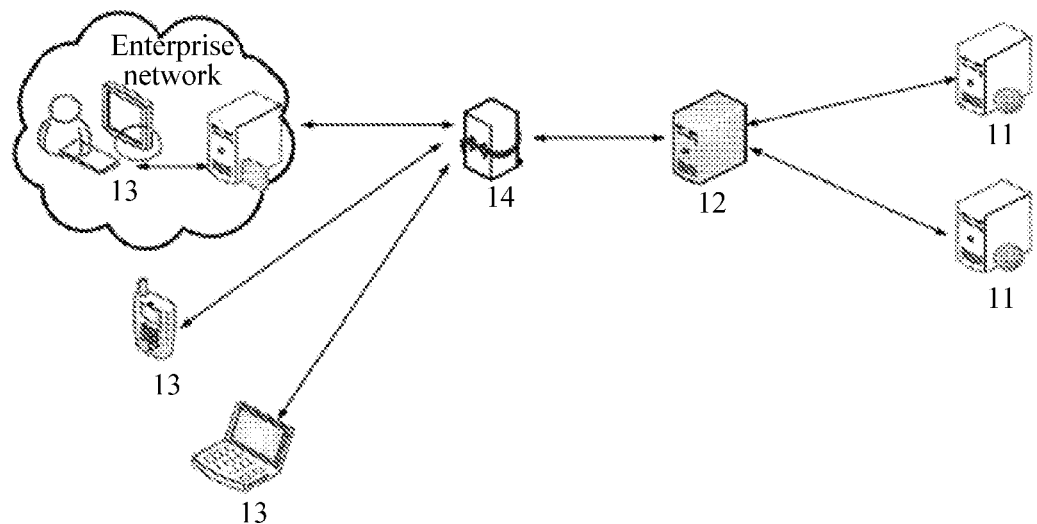
FIG. 1 is a schematic diagram of an application scenario of a webshell detection method according to an embodiment.

FIG. 1 is a schematic diagram of an application scenario according to an embodiment of this application. A network system includes a website server 11, a security device 12, and a plurality of terminals 13. The website server 11 is an example of a protected host. In this embodiment of the present invention, the protected host is a host capable of providing web page services. After Apache application software or Microsoft Internet Information Services (IIS) application software is installed on the host, the host may serve as a website server to provide web page services to other users on a network.

The terminal 13 is a terminal device having a web page visit function in this embodiment of this application, for example, a personal computer, a smartphone, or a portable computer installed with a browser. The browser is an application program used to retrieve and display internet information resources. Current common browsers include, for example, Internet Explorer, Mozilla Firefox, and Google Chrome. The terminal 13 may be located in a local area network and access the website server 11 on the internet via a network address translation (NAT) device. The terminal 13 may also access the website server 11 on the internet directly by using a public IP address.

The security device 12 obtains web traffic generated when the terminal 13 accesses the website server 11. As shown in FIG. 1, the security device 12 is configured on a communication path between the terminal 13 and the website server 11, and all traffic visiting the website server 11 is forwarded to the website server by the security device 12. For example, the security device 12 is a firewall configured in front of the website server 11, and the website server 11 accesses a network via the firewall. In this deployment manner, the security device 12 saves web traffic flowing through the security device 12 to access the website server 11. The security device 12 may alternatively be deployed in an off-path manner, which is not shown in FIG. 1. For example, the website server 11 accesses a network via a gateway device 14, and the security device 12 is a DPI device connected to the gateway device 14. The gateway device 14 performs mirroring processing on traffic visiting the website server 11 by the terminal 13, and then sends mirrored traffic obtained through the mirroring processing to the DPI device. In this embodiment of this application, a specific deployment manner of the security device 12 is not limited, provided that the security device 12 can obtain the web traffic visiting the website server 11 by the terminal 13.

A real network environment is usually more complex, and the security device 12 may participate in a traffic forwarding process of another network device. In this case, an IP address of one protected host or IP addresses of more than one protected host may be prestored in the security device 12. The security device 12 obtains, by filtering all obtained traffic based on the prestored IP address(es) of the protected host(s) and a web access related protocol type, for example, HTTP, traffic generated when a web page provided by the protected host is visited.

The method provided in this embodiment is used to inspect web pages provided by a plurality of protected hosts. For ease of description, this embodiment of this application is mainly described by merely using an example in which the protected host is one website server. In a case of a plurality of protected hosts, similar processing may be performed.

Figure 2:
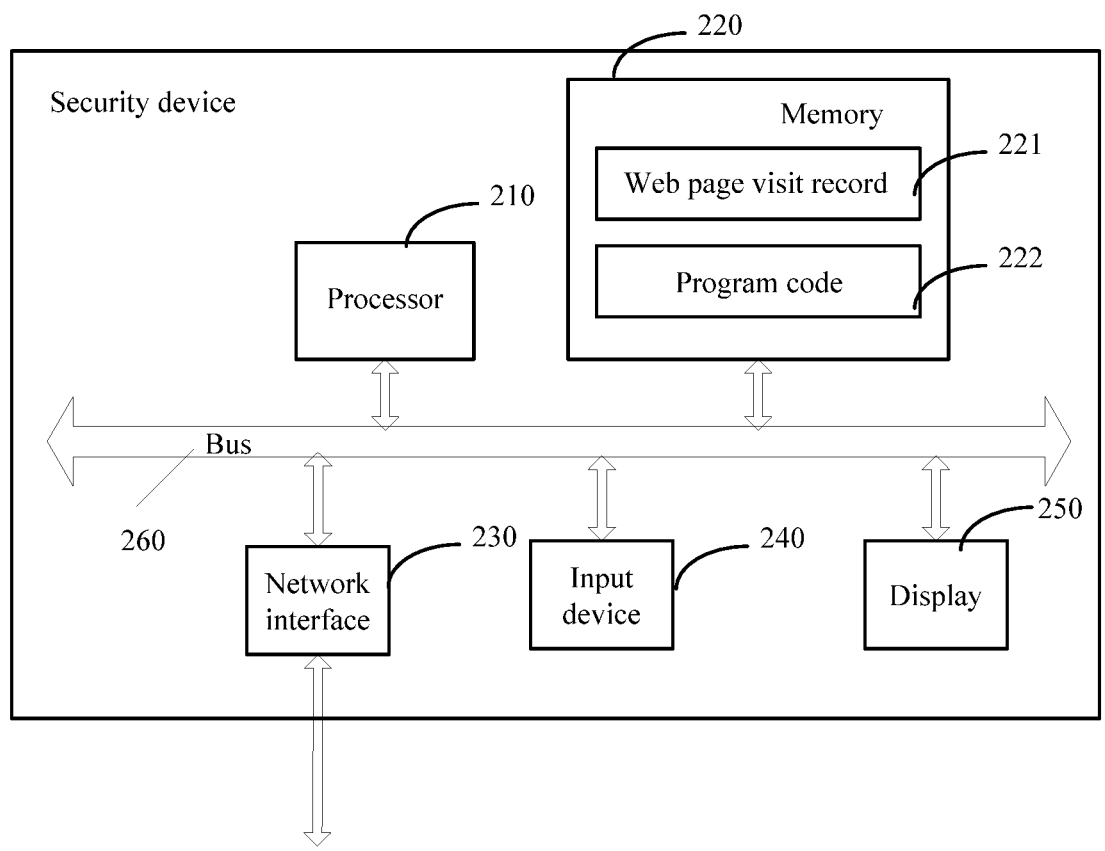
FIG. 2 is a schematic structural diagram of a security device according to an embodiment.

FIG. 2 is a schematic structural diagram of a security device according to an embodiment. The security device may be the security device 12 in FIG. 1. The security device includes a processor 210, a memory 220, a network interface 230, an input device 240, a display 250, and a bus 260. The processor 210, the memory 220, the network interface 230, the input device 240, and the display 250 are connected to each other by using the bus 260.

The processor 210 may be one or more central processing units (CPU). When the processor 210 is one CPU, the CPU may be a single-core CPU or may be a multi-core CPU.

The memory 220 includes but is not limited to a random access memory (RAM), a read-only memory (ROM), an erasable programmable read only memory (EPROM or a flash memory), or a portable read-only memory (CD-ROM).

The network interface 230 may be a wired interface, for example, a fiber distributed data interface (FDDI) or a Gigabit Ethernet (GE) interface. The network interface 230 may alternatively be a wireless interface.

The processor 210 is configured to read program code 222 stored in the memory 220 and perform the following operations after executing the program code 222:

Specifically, the processor 210 obtains first web traffic of a protected host by using the network interface 230. The first web traffic of the protected host is traffic generated when a web page provided by the protected host is visited during a first period. To differentiate web traffic obtained at different stages, in this embodiment of this application, web traffic based on which a web page visit record is generated is referred to as first web traffic, and web traffic received after the web page visit record is generated is referred to as second web traffic. The second web traffic may be used to update the web page visit record.

The processor 210 generates the web page visit record 221 of the protected host based on the first web traffic. The web page visit record saves at least one URL, an IP address visiting each of the at least one URL, and a total quantity of visits to each URL. Each URL identifies one web page provided by the protected host. The processor 210 stores the generated web page visit record 221 into the memory 220.

The processor 210 determines a suspicious URL from the at least one URL based on the web page visit record. A total quantity of visits to the suspicious URL is less than a first threshold, and a ratio of a quantity of different IP addresses visiting the suspicious URL to the total quantity of visits to the suspicious URL is less than a second threshold. The processor 210 detects, based on a webshell signature database in the memory 220, whether a webshell exists in a web page identified by the suspicious URL.

Only an attacker knows a storage location of a webshell file in a web page directory of a website server, while normal users do not know the storage location of the webshell file. Therefore, usually, only the attacker visits the webshell file, and the normal users do not visit the webshell file. In contrast to that, a normal web page file provided to the public by the website server is frequently visited by a large quantity of normal users. Therefore, a visit distribution status of a webshell file is greatly different from a visit distribution status of a normal web page file. A normal web page file is characterized by a high visit frequency and wide distribution of visitor IP addresses, whereas a webshell file is characterized by low visit frequency and few visitor IP addresses. Certainly, the attacker may evade monitoring to some extent by, for example, configuring a proxy server or forging an IP address. Therefore, the suspicious URL is identified based on a difference in visit behavior, and further detection is performed on the web page identified by the suspicious URL.

In this embodiment, the security device constructs a web page visit record able to reflect a quantity of visits to each web page of the protected host, distribution of visitor IP addresses, and other statuses, identifies a relatively highly suspicious URL from URLs of all web pages provided by the protected host, and afterwards focuses detection on the web page identified by the suspicious URL, without a need to inspect all the web pages. A quantity of to-be-inspected web pages is reduced, and therefore web inspection performance is improved.

The following describes in detail a webshell detection method provided in this application with reference to flowcharts.

Figure 3:
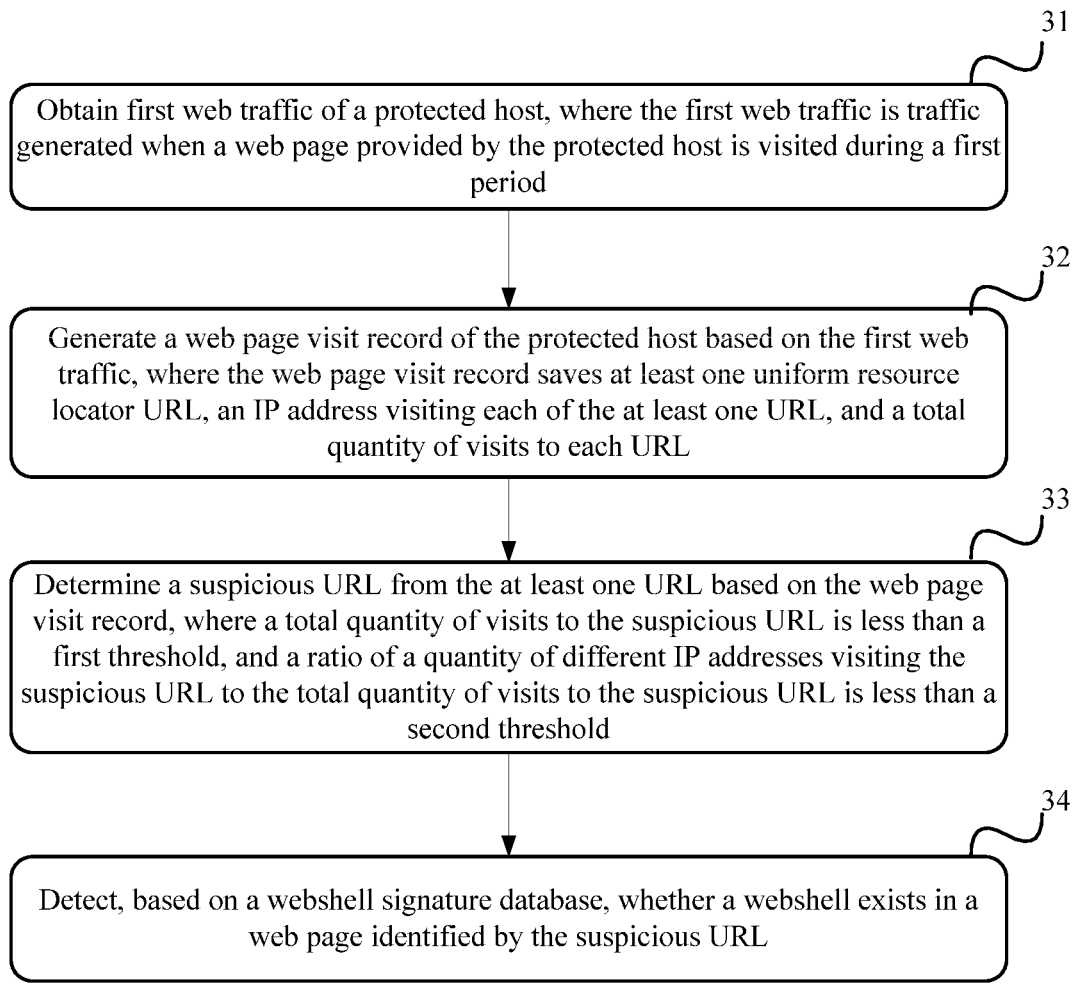
FIG. 3 is a flowchart of a webshell detection method according to an embodiment.

FIG. 3 is a principle flowchart of a webshell detection method according to an embodiment of this application. The method may be executed by the security device 12 in FIG. 1.

Step 31: Obtain first web traffic of a protected host, where the first web traffic is traffic generated when a web page provided by the protected host is visited during a first period.

An IP address of the protected host is prestored in the security device. In a case of in-path deployment, after accessing a network, the security device compares a source address or a destination address of a packet flowing through the security device with the IP address of the protected host, and saves the packet if the source address or the destination address of the packet is the same as the IP address of the protected host and a protocol type of the packet is HTTP, so as to obtain the first web traffic of the protected host. In a case of off-path deployment, the security device compares a source address or a destination address of a packet in mirrored traffic sent from a gateway device with the IP address of the protected host. The security device saves the packet if the source address or the destination address of the packet is the same as the IP address of the protected host and a protocol type of the packet is HTTP; or skips saving the packet if the source address or the destination address of the packet is different from the IP address of the protected host or a protocol type of the packet is not related to web access, so as to save storage space.

Step 32: Generate a web page visit record of the protected host based on the first web traffic. The web page visit record is used to save the following information: at least one URL, an IP address visiting each of the at least one URL, and a total quantity of visits to each URL. Each URL identifies one web page provided by the protected host.

Specifically, the web page visit record includes a plurality of entries, and each entry is corresponding to one of the at least one URL. Each entry saves the corresponding URL, and saves a total quantity of visits to the URL corresponding to the entry and an IP address visiting the URL corresponding to the entry.

The security device may organize the plurality of entries in the web page visit record by using different data structures, for example, a multidimensional array or a hash table.

Figure 4:
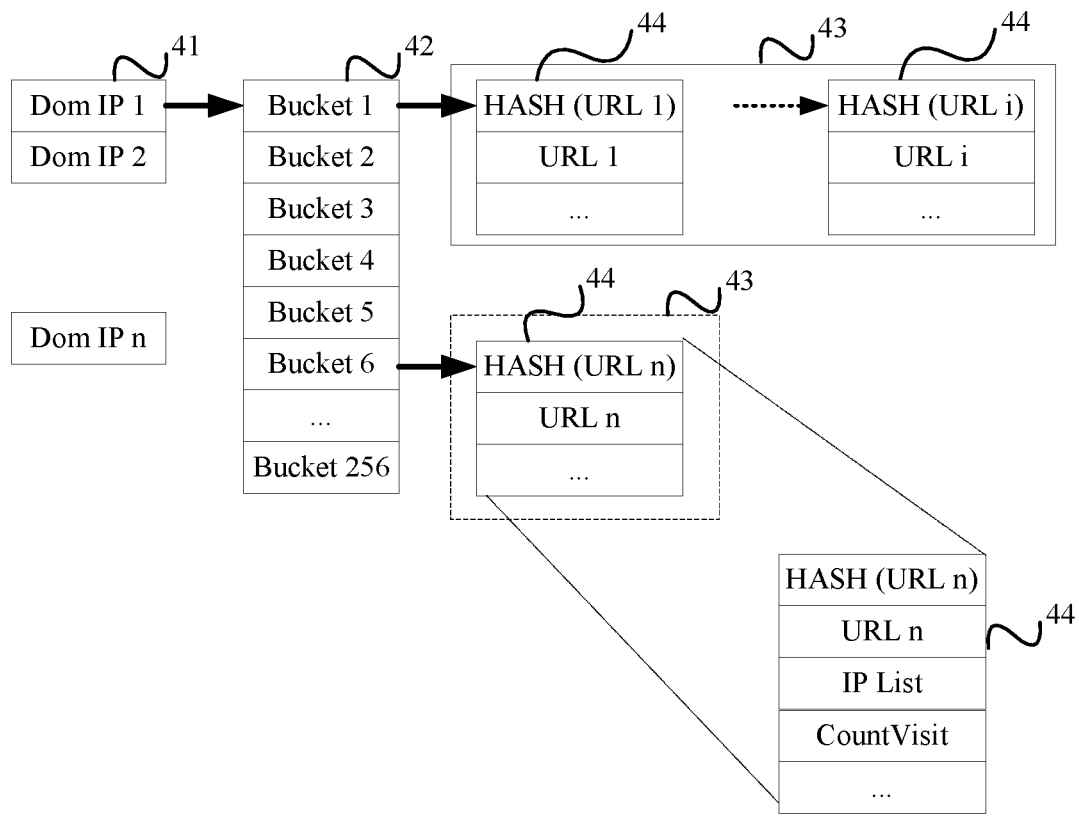
FIG. 4 is a schematic structural diagram of a hash table according to an embodiment.

For ease of search and update of stored information, this embodiment of this application provides a hash table to save the web page visit record. As shown in FIG. 4, specifically, a bucket is used to implement a hash table. An IP address of each protected host is corresponding to one bucket (Bucket) table. For example, in this embodiment, the IP address of each protected host is represented by 41, a bucket table is represented by 42, and the bucket table 42 corresponding to each address 41 includes 256 buckets.

Each bucket in the bucket table 42 is a virtual subset of entries in the hash table. Each bucket is corresponding to one linked list of a different length composed of entries. In FIG. 4, a linked list is represented by 43, and an entry is represented by 44. Zero, one, or more entries 44 are stored in the linked list 43. Each entry includes an index key and a value. The index key of each entry is a result obtained by performing a hash operation on a URL, and the value is the URL. Each entry also saves information such as a total quantity of visits CountVisit used to record a total quantity of visits to the URL and an IP address list IP List used to record an IP address visiting the URL. A hash algorithm includes message-digest algorithm 5 (MD5).

Figure 6:
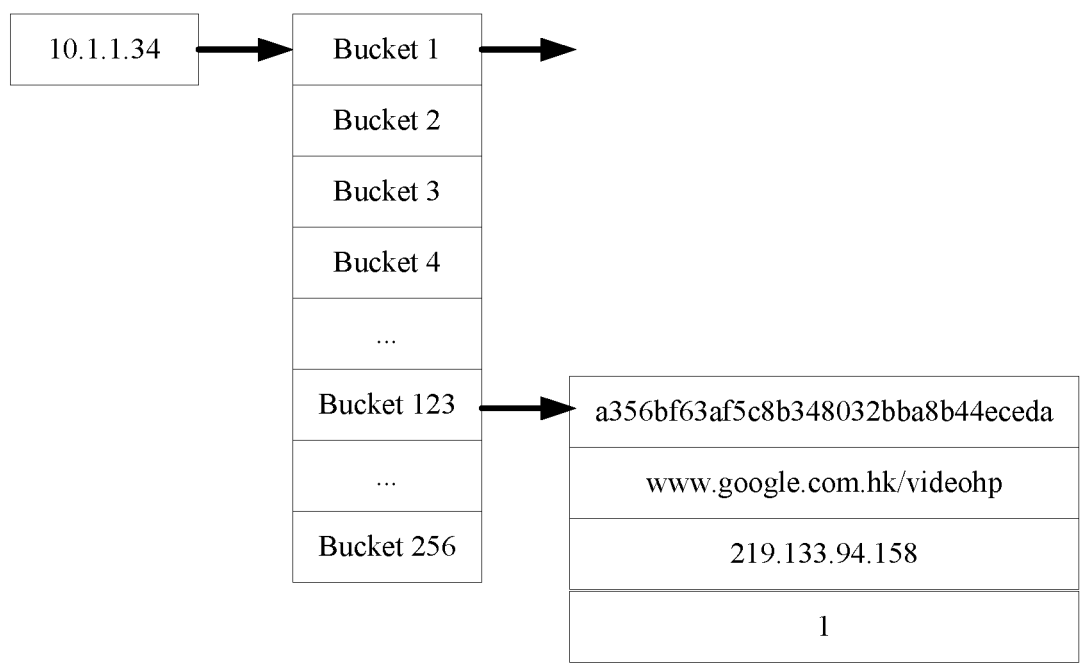
FIG. 6 is an example diagram of an entry according to an embodiment.
Figure 7:
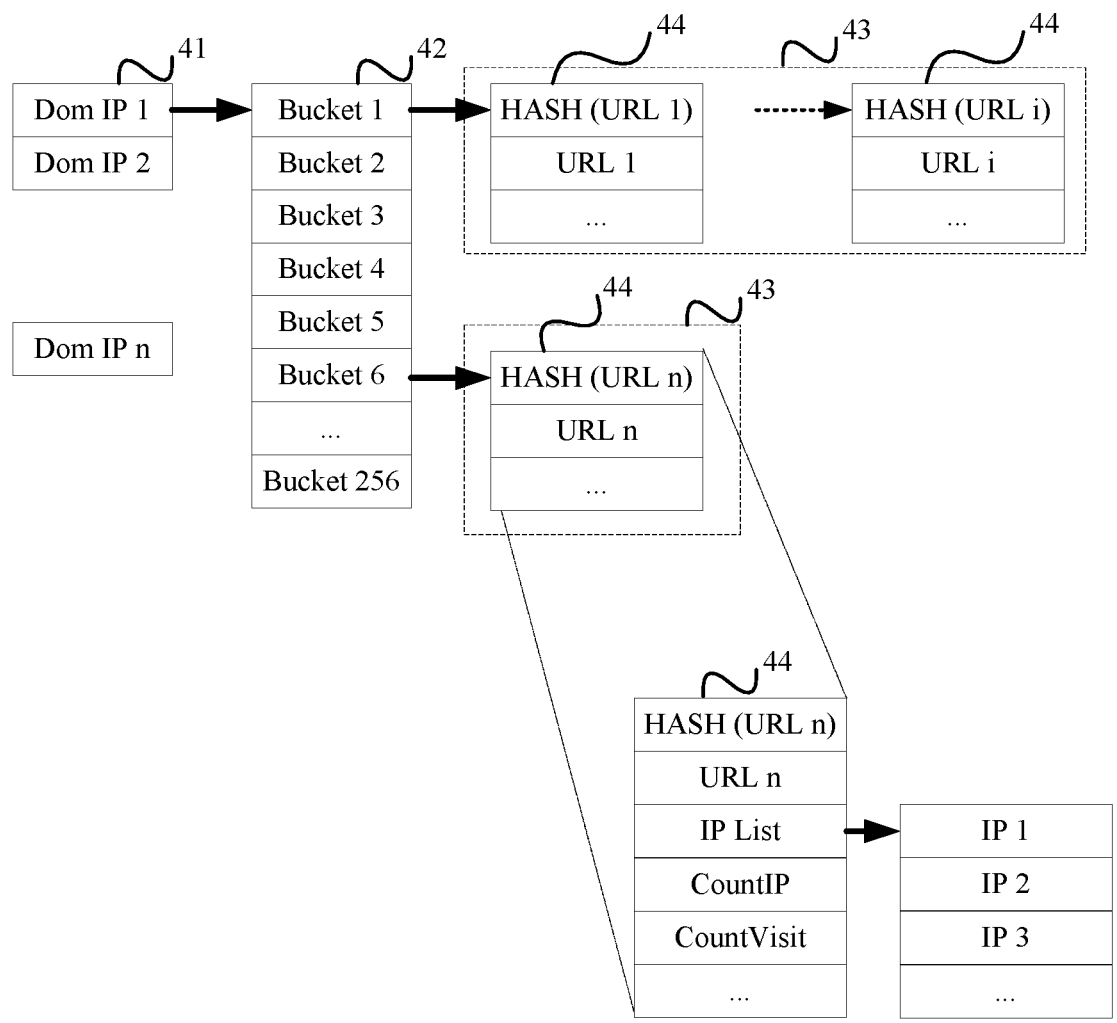
FIG. 7 is a schematic structural diagram of another hash table according to an embodiment.

In the following other embodiments, a detailed process of constructing the hash table shown in FIG. 4 is described with reference to FIG. 5 to FIG. 7.

Step 33: Determine a suspicious URL from the at least one URL based on the web page visit record, where a total quantity of visits to the suspicious URL is less than a first threshold, and a ratio of a quantity of different IP addresses visiting the suspicious URL to the total quantity of visits to the suspicious URL is less than a second threshold. The first threshold and the second threshold are prestored in the security device. The first threshold and the second threshold may be set by a network manager based on experience and an actual network environment and input into the security device by using the input device 240 in FIG. 2, or may be obtained through machine learning based on a pre-calibrated web traffic sample. This embodiment is not limited in this sense.

Optionally, the security device regularly differentiates, based on the first threshold and the second threshold, between information stored in entries of the hash table shown in FIG. 4, so as to identify the suspicious URL. The first threshold is a natural number, and a value range may be set based on experience, storage space of a memory, and a differentiation period. The value range of the first threshold may be increased appropriately as the differentiation period becomes longer and the storage space becomes larger, so as to achieve a more accurate identification result. A specific value may be flexibly set based on an actual situation. For example, the differentiation period is 10 days, and a value of the first threshold is 1000.

The second threshold is a percentage ranging from 0 to 1. A value of the second threshold may also be set based on experience and an actual network environment. A smaller value of the second threshold indicates a lower false positive rate of the identified suspicious URL, but entails a false negative rate. A larger value of the second threshold indicates a higher false positive rate of the identified suspicious URL and a lower false negative rate. For example, the second threshold may be set to 50%.

Step 34: Determine whether a web page identified by the suspicious URL contains a webshell signature in a webshell signature database, and detect, based on a determining result, whether a webshell exists in the web page identified by the suspicious URL.

Generally, in a web page visit process, a browser first establishes a connection to a website server based on the Transmission Control Protocol (TCP), and then sends an access request packet, for example, an HTTP request GET packet or an HTTP request POST packet, to the website server by using the established connection. The access request packet carries a URL of a to-be-visited page.

After receiving the access request packet, the website server searches a web page directory for a corresponding web page file based on the URL carried in the access request packet. The website server sends an access response packet, for example, an HTTP request response packet, to the browser based on a search result. The access response packet carries a status code. For example, HTTP defines five categories of status codes in version 1.1. The status code is composed of three digits, and the first digit defines a class of a response. Specifically:

1xx (informational): The request has been successfully received and processing continues;

2xx (successful): The request has been successfully received, understood, and accepted:

3xx (redirection): Further processing needs to be performed to complete the request;

4xx (client error): The request contains bad syntax or cannot be fulfilled; and

5xx (server error): The server fails to fulfill a valid request.

If the status code indicates a successful visit, the website server sends the web page file to the browser based on an amount of data of the found web page file by using one or more response packets.

After obtaining the suspicious URL by performing steps 31 to 33, the security device may further obtain packets exchanged between the browser and the website server when the web page identified by the suspicious URL is visited. Then, the security device may detect, in a packet-based detection manner or a data streambased detection manner and based on the webshell signature database, whether a webshell exists in a web page carried in the foregoing exchanged packets.

Specifically, the security device may obtain the packets exchanged between the browser and the website server when the web page identified by the suspicious URL is visited, in the following manners.

Manner 1

The security device searches the saved first web traffic of the protected host for exchanged packets generated when a terminal visits the web page identified by the suspicious URL. For example, the security device parses one access request packet in the first web traffic according to related standards of the HTTP protocol, to obtain the following information carried in the access request packet:

Internet Protocol Version 4, Src: 219.133.94.158, Dst: 10.1.1.34
Transmission Control Protocol, Src Port: 1272(1272), Dst Port: 80(80), Seq:1, Ack: 1, Len:89
Hypertext Transfer Protocol
GET http://www.google.com.hk/videohp HTTP/1.1
Accept-Language: en-us
UA-CPU: X86
Accept-Encoding: gzip, deflate
User-Agent: Mozilla/4.0
Host: www.google.com.hk
Connection: Keep-Alive
Cache-Control: no-cache A URL carried in the access request packet and obtained by the security device is www.google.com.hk/videohp behind the key word GET. The security device compares the obtained URL with the suspicious URL, and if the URL carried in the access request packet is the same as the suspicious URL, obtains all packets of a data stream to which the access request packet belongs, from the first web traffic based on information such as a source address, a destination address, a source port, a destination port, a protocol type, a sequence number, and a timestamp of the access request packet. The obtained packets are packets exchanged between the browser and the website server when the web page identified by the suspicious URL is visited.

Manner 2

The security device visits, by using a browser installed on the security device, the page identified by the suspicious URL, and saves a series of packets generated during interaction with the website server in this process, so as to obtain packets exchanged between the browser and the website server when the web page identified by the suspicious URL is visited.

When the packet-based detection manner is used, the security device matches each obtained packet exchanged between the browser and the website server when the web page identified by the suspicious URL is visited against signatures in the webshell signature database, and if signatures hit in the matching satisfy a preset rule, for example, signatures hit in the matching have exceeded a predetermined quantity, determines that a webshell exists in the web page identified by the suspicious URL. In an implementation process, a multi-pattern matching state machine may be generated in advance based on the signatures in the webshell signature database, content of an individual packet is input into the state machine, and all signatures that the packet is matched to can be found with one scan, thereby improving detection performance.

When the data streambased detection manner is used, after obtaining the packets exchanged between the browser and the website server when the web page identified by the suspicious URL is visited, the security device performs stream reassembly on the packets to obtain payload content of a data stream, and matches the payload content against the signatures in the webshell signature database. The security device determines, through detection based on a matching hit result and a predetermined webshell identification rule, whether a webshell exists in the web page identified by the suspicious URL. The predetermined webshell identification rule includes that if signatures A, B, and C appear successively in signatures hit in the matching, it is determined that a webshell exists in the web page identified by the suspicious URL; or that if there are more than three signatures hit in the matching, it is determined that a webshell exists in the web page identified by the suspicious URL.

Figure 5:
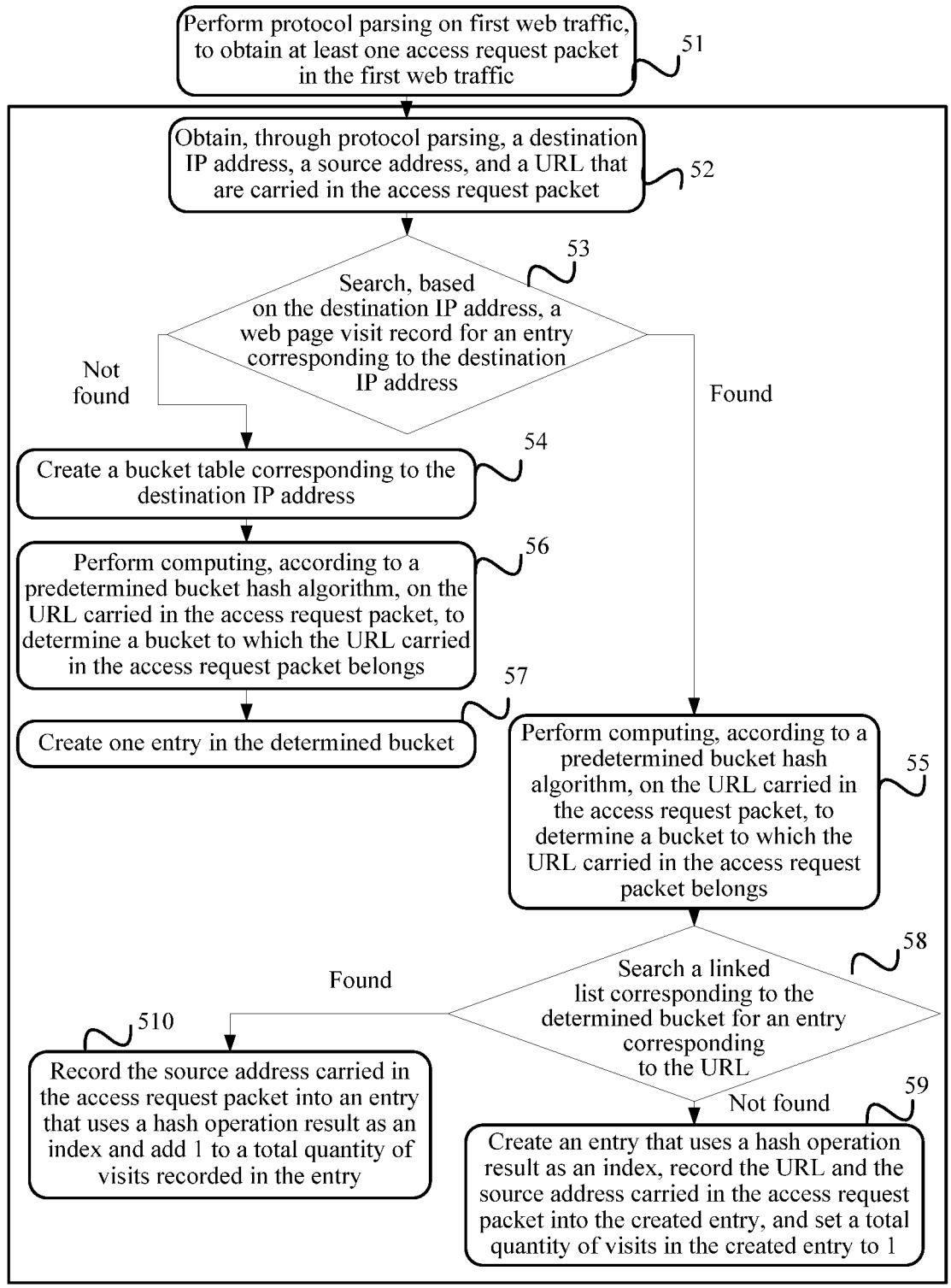
FIG. 5 is a flowchart of a method for constructing a web page visit record based on first web traffic according to an embodiment.

FIG. 5 is a flowchart of a method for constructing a web page visit record based on first web traffic according to an embodiment of this application.

Step 51: A security device performs protocol parsing on first web traffic, to obtain at least one access request packet in the first web traffic. In this embodiment, the access request packet is an HTTP request GET packet sent by a browser to a website server. A destination IP address of the HTTP request GET packet is an IP address of a protected host. The security device performs steps 52 to 58 on each of the at least one access request packet, until all access request packets are processed. Specifically, the security device may select the at least one access request packet one by one according to a preset selection rule. For example, access request packets are selected one by one in chronological order based on timestamps carried in the access request packets.

In steps 52 to 510, a processing process is described in detail by using one access request packet as an example.

Step 52: The security device obtains, through protocol parsing, a destination IP address and a source address of and a URL carried in the access request packet.

Step 53: The security device searches, based on the destination IP address, a web page visit record for an entry corresponding to the destination IP address. To be specific, the security device determines whether the destination IP address and a bucket table corresponding to the destination IP address have been recorded in the web page visit record. If the destination address is not recorded in the web page visit record, step 54 is performed. If the destination address has been recorded in the web page visit record, step 55 is performed.

Step 54: The security device records the destination IP address and creates the bucket table corresponding to the destination IP address. Step 56 is further performed. Specifically, the security device records the destination IP address into the web page visit record and creates the bucket table corresponding to the destination IP address, where the bucket table includes 256 buckets. A linked list corresponding to each bucket in the bucket table is initially empty.

Step 56: The security device performs computing, according to a predetermined bucket hash algorithm, on the URL carried in the access request packet, to determine a bucket to which the URL carried in the access request packet belongs. Step 57 is further performed.

Step 57: The security device creates one entry in the determined bucket. An index key of the created entry is a result obtained by performing a hash operation on the URL carried in the access request packet, and the security device records the URL into the created entry, sets a total quantity of visits saved in the created entry to 1, and records the source address obtained through parsing in step 52 into an IP address list in the entry.

Step 55: The security device performs computing, according to a predetermined bucket hash algorithm, on the URL carried in the access request packet, to determine a bucket to which the URL carried in the access request packet belongs. Step 58 is further performed.

Step 58: The security device searches a linked list corresponding to the determined bucket for an entry corresponding to the URL.

The security device performs a hash operation on the URL and searches the linked list corresponding to the found bucket for an entry that uses a hash operation result as an index. If no entry that uses a hash operation result as an index exists, step 59 is performed. If an entry that uses a hash operation result as an index exists, step 510 is performed.

Step 59: The security device creates an entry that uses a hash operation result as an index, records the URL into the created entry, records the source address carried in the access request packet into an IP address list in the entry, and sets a total quantity of visits in the created entry to 1.

Step 510: The security device records the source address carried in the access request packet into an IP address list in an entry that uses a hash operation result as an index and adds 1 to a total quantity of visits saved in the entry that uses a hash operation result as an index.

For example, the security device obtains, through protocol parsing, a destination IP address 10.1.1.34, a source address 219.133.94.158, and a URL www.google.com.hk/videohp carried in an access request packet in the first web traffic. The destination address 10.1.1.34 is the same as the IP address of the protected host.

A preset hash algorithm in the security device is a 32-place MD5 algorithm. When a URL of any length is input, a 32-place hexadecimal symbol is output. In this example, a result obtained after a hash operation is performed on www.google.com.hk/videohp is a356bf63af5c8b348032bba8b44eceda.

An objective of the bucket hash algorithm is to classify any hash result under one of 256 buckets. In this example, the bucket hash algorithm is specifically dividing a hash operation result into 16 groups sequentially, with each group including two places, and performing AND operations successively to finally obtain two hexadecimal symbols; and performing a rem 256 operation on the two hexadecimal symbols, and using a rem result as a sequence number of a bucket.

For example, a3|56|bf|63|af|5c|8b|34|80|32|bb|a8|b4|4e|ce|da=ab, ab %256=163, and www.google.com.hk/videohp is determined to belong to a bucket 163.

The bucket 163 is searched for an entry whose index key is a356bf63af5c8b348032bba8b44eceda. In this example, it is assumed that no entry whose index key is a356bf63af5c8b348032bba8b44eceda exists in the bucket 163, and the security device creates an entry whose index key is a356bf63af5c8b348032bba8b44eceda at the end of a linked list corresponding to the bucket 163 or inserts the entry at a predetermined position of the linked list according to a predetermined rule. www.google.com.hk/videohp is recorded in the created entry, the source address 219.133.94.158 carried in the access request packet is recorded in an IP address list in the created entry, and a total quantity of visits in the created entry is set to 1. An entry created through the foregoing processing is shown in FIG. 6.

Correspondingly, after the web page visit record is constructed by using the method shown in FIG. 5, in step 33 in FIG. 3, in determining whether a URL corresponding to each entry is a suspicious URL, first, an IP address list IP List in the entry is obtained, IP addresses different from one another in the IP address list are determined, and a quantity of the IP addresses different from one another is calculated; and then a total quantity of visits CountVisit is obtained. If a value of the total quantity of visits CountVisit is less than the first threshold, and a ratio of the calculated quantity of IP addresses different from one another to the value of the total quantity of visits CountVisit is less than the second threshold, a URL corresponding to the entry is determined as a suspicious URL.

To improve efficiency of suspicious URL identification, the data structure of the entry 44 shown in FIG. 4 may be further improved. An IP address count CountIP is added, and the IP address count is used to record a quantity of IP addresses visiting the URL that are different from one another. In addition, only IP addresses different from one another are recorded in the IP address list IP List, as shown in FIG. 7.

Correspondingly, the method for constructing a web page visit record shown in FIG. 5 also requires adaptive adjustment. Specifically, in step 57 or step 59, if the entry corresponding to the URL carried in the access request packet is not found, the entry corresponding to the URL carried in the access request packet is created in the web page visit record, the total quantity of visits in the created entry is set to 1, an IP address count in the created entry is set to 1, and the source IP address of the access request packet is recorded in the IP address list in the created entry.

In step 510, if the entry corresponding to the URL carried in the access request packet is found, 1 is added to the total quantity of visits in the found entry. Whether the source IP address of the access request packet has been saved in the IP address list in the found entry needs to be further determined. If the source IP address of the access request packet has been saved in the IP address list in the found entry is found, processing on the access request packet ends. If the source IP address of the access request packet has not been saved in the IP address list in the found entry, 1 is added to an IP address count in the found entry, and the source IP address of the access request packet is recorded in the IP address list in the found entry.

With the foregoing improvement, in step 33 in FIG. 3, in determining whether a URL corresponding to each entry is a suspicious URL, only a total quantity of visits CountVisit and an IP address count CountIP need to be obtained, and whether a URL corresponding to the entry is a suspicious URL can be easily determined. Specifically, if a value of the total quantity of visits CountVisit is less than the first threshold, and a ratio of a value of the IP address count CountIP to the value of the total quantity of visits CountVisit is less than the second threshold, the URL corresponding to the entry is determined as a suspicious URL.

Optionally, when a terminal visits a web page by using the browser, it is possible that this visit process is not successful. For an attacker, if visiting a webshell file fails, an attack cannot succeed. It is meaningless for the security device to perform detection on pages failing to be visited, because packets exchanged between the browser and the website server cannot be obtained in step 34 in FIG. 3. To prevent a possible waste of processing resources caused by subsequent detection on the pages failing to be visited and a waste of storage space caused by saving entries corresponding to URLs of the pages failing to be visited in the web page visit record, in the web page visit record construction process of the method shown in FIG. 5 to FIG. 7, the following improvement may be made to step 51 in obtaining at least one access request packet from the first web traffic.

The security device first selects at least one access response packet from the first web traffic, in which a status code carried in each web page access response packet indicates a successful visit. The access response packet is a packet returned to the browser by the website server after the website server receives the access request packet. In this application, only an access response packet whose source address is the IP address of the protected host is considered.

For example, content obtained by parsing the access response packet of a successful visit is as follows:
  HTTP/1.1 200 OK
  Date: Wed, 10 Jun. 2009 11:22:58 GMT
  Server: Micro oft-IIS/6.0
  X-Powered-By: ASP.NET
  Content-Length: 4218
  Content-Type: text/html
  Cache-control: private
The status code "200 OK" indicates a successful visit.

Then, the security device determines a correspondence between access request packets and access response packets in the first web traffic based on information such as source addresses, source ports, destination addresses, destination ports, protocol types, sequence numbers, and acknowledgement numbers, carried in the packets, and therefore obtains, from the first web traffic, a respective access request packet corresponding to each of the at least one access response packet that indicates a successful visit, and uses the access request packet as the obtained at least one access request packet.

In addition, when the terminal accesses the website server by using a browser, because the terminal may be installed with browsers provided by different vendors or browsers of different versions, and different browsers differ in terms of program design, different URLs are carried in a plurality of access request packets generated when the different browsers visit a same web page provided by the website server. Specifically, although the plurality of access request packets visit a same web page, URLs carried in the plurality of access request packets use different uppercase/lowercase manners or different coding schemes, or carry different parameters. The security device performs processing on these access request packets based on different URLs carried, so as to create different entries in the web page visit record. Such a processing manner does not conform to the fact that these access request packets actually visit a same web page, causing an error in subsequent identification of a suspicious URL, and also leads to an excessively large data volume of the web page visit record. To improve accuracy in identification of the suspicious URL and reduce storage space occupied by the web page visit record in a memory, optionally, in the web page visit record construction process of the method shown in FIG. 5 to FIG. 7, before the security device searches a linked list corresponding to the determined bucket for an entry corresponding to the URL in step 58, the security device performs at least one type of the following several normalization processing on the URLs obtained through parsing.

1. Convert characters in the URLs obtained through parsing into a predetermined uppercase/lowercase type, for example, converting all characters into the lower case.
 2. Convert the URLs obtained through parsing into a predetermined code scheme. Coding schemes possibly used for URLs include, for example, GB2312, GBK, and UTF8. In this example, all URLs are converted into GBK codes.
 3. Remove parameters in the URLs obtained through parsing.

For example, a URL 1 obtained through parsing is www.google.com.hk/videohp?hl=zh-cn&tab=wv, and after a parameter is removed, the URL 1 becomes www.google.com.hk/videohp. A URL 2 obtained through parsing is www.google.com.hk/videohp?hl=zh-cn&tab=wv&aq=f, and after a parameter is removed, the URL 2 becomes www.google.com.hk/videohp.

Therefore, the normalization-processed URL 1 and URL 2 are the same, and corresponding to a same entry in the web page visit record. This can effectively control a scale of the web page visit record and saves storage resources.

When the website server provides a relatively large quantity or a continuously growing quantity of page files, a relatively large quantity of storage sources are occupied when the security device stores the IP address visiting each of the at least one URL and the total quantity of visits to each URL by using the data structure shown in FIG. 4. Optionally, the security device identifies a normal URL based on the first threshold or a webshell detection result, deletes an IP address visiting the normal URL and a total quantity of visits to the normal URL that are saved in the web page visit record, and later does not update the IP address visiting the normal URL and the total quantity of visits to the normal URL any more, so as to save storage resources and processing resources.

Figure 8A:
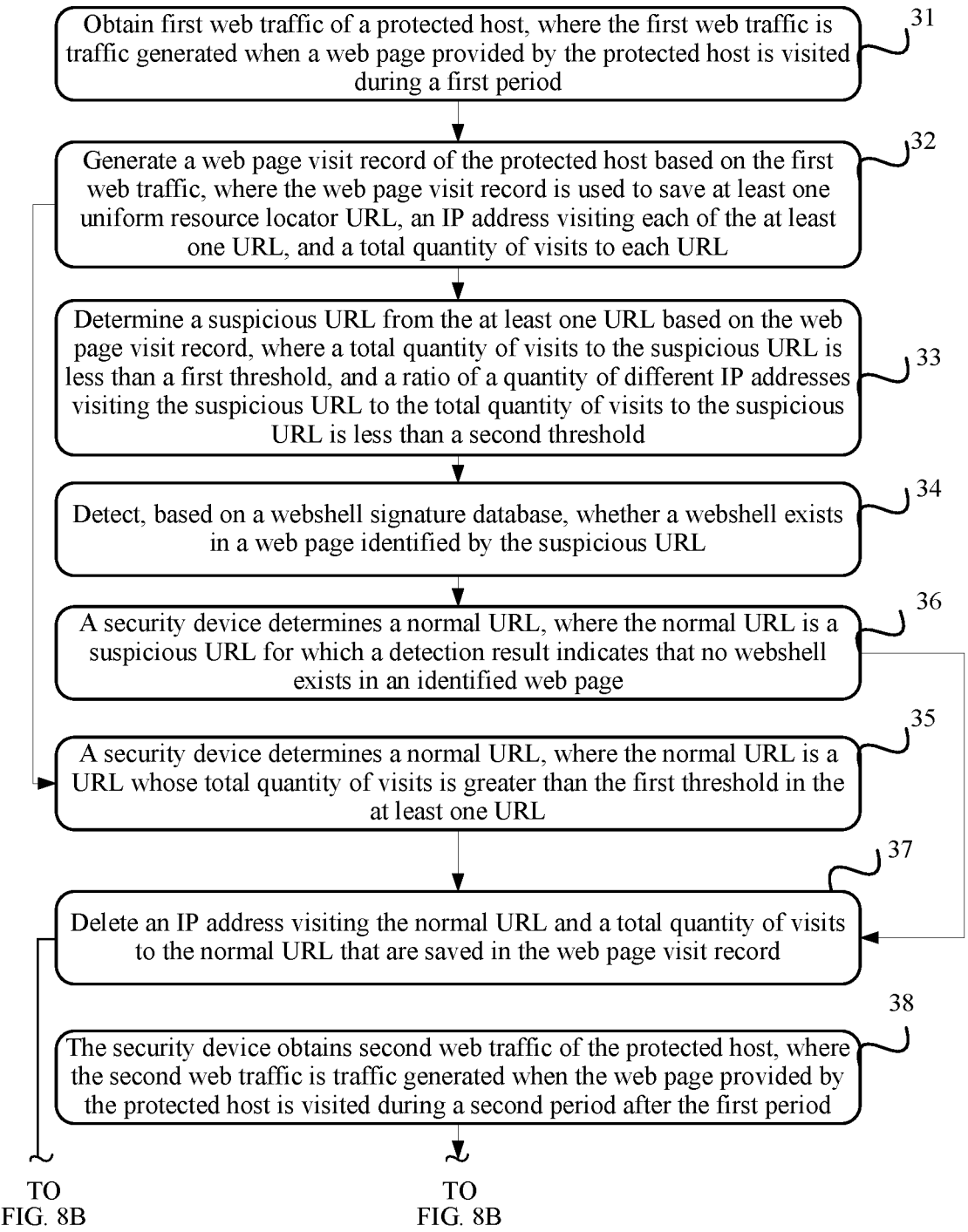
FIG. 8A and FIG. 8B are another flowchart of a webshell detection method according to an embodiment.

Bases on the foregoing consideration, the webshell detection method shown in FIG. 3 is improved. For an improved flowchart, refer to FIG. 8A and FIG. 8B. Steps 31 to 34 in FIG. 8A are the same as those in FIG. 3. After step 32, the method further includes the following step:

Step 35: The security device determines a normal URL, where the normal URL is a URL whose total quantity of visits is greater than the first threshold in the at least one URL.

After step 34, the method further includes the following step:

Step 36: The security device determines a normal URL, where the normal URL is a suspicious URL for which a webshell detection result indicates that no webshell exists in an identified web page.

After steps 35 and 36, the security device performs step 37: deleting an IP address visiting the normal URL and a total quantity of visits to the normal URL that are saved in the web page visit record. It should be noted that either or both of step 35 and step 36 may be performed.

As information is growing quickly, website servers are providing an increasing quantity of normal web pages, and the web page visit record needs to be updated in time. In this embodiment of this application, to adapt to this situation, after step 37, the method further includes the following steps:

Step 38: The security device obtains second web traffic of the protected host, where the second web traffic is traffic generated when the web page provided by the protected host is visited during a second period after the first period.

Step 39: The security device obtains an access request packet from the second web traffic and parses the access request packet to obtain a source address of and a URL carried in the access request packet.

Step 310: The security device determines whether the URL carried in the access request packet obtained in step 39 is the same as the normal URL; and if they are the same, ends processing the access request; and if there are still access request packets not yet processed in the second web traffic, continues to process a not-yet-processed access request packet. If they are different, step 311 is performed.

Step 311: The security device determines whether the URL carried in the access request packet has been saved in the web page visit record. If the URL carried in the access request packet has been saved, step 312 is performed. If the URL carried in the access request packet has not been saved, step 313 is performed.

Step 312: The security device adds 1 to a total quantity of visits to the saved URL carried in the first access request packet, and adds the source IP address of the access request packet to an IP address visiting the URL carried in the access request packet; and if there are still access request packets not yet processed in the second web traffic, continues to process a not-yet-processed access request packet.

Step 313: The security device saves the URL carried in the access request packet into the web page visit record, sets a total quantity of visits to the URL carried in the access request packet to 1, and sets an IP address visiting the URL carried in the access request packet to the source IP address of the access request; and if there are still access request packets not yet processed in the second web traffic, continues to process another not-yet-processed access request packet.

Figure 8B:
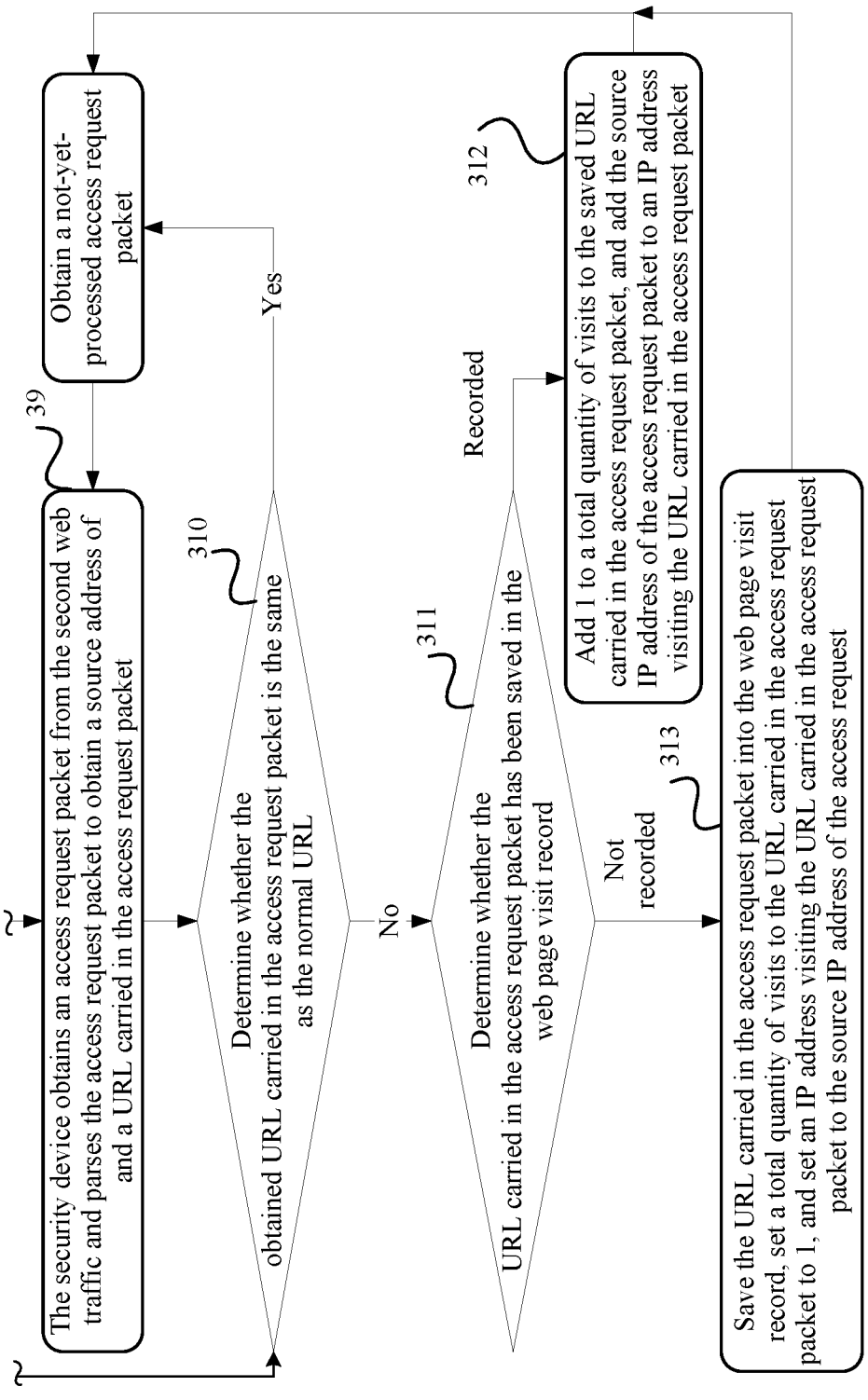
Figure 9:
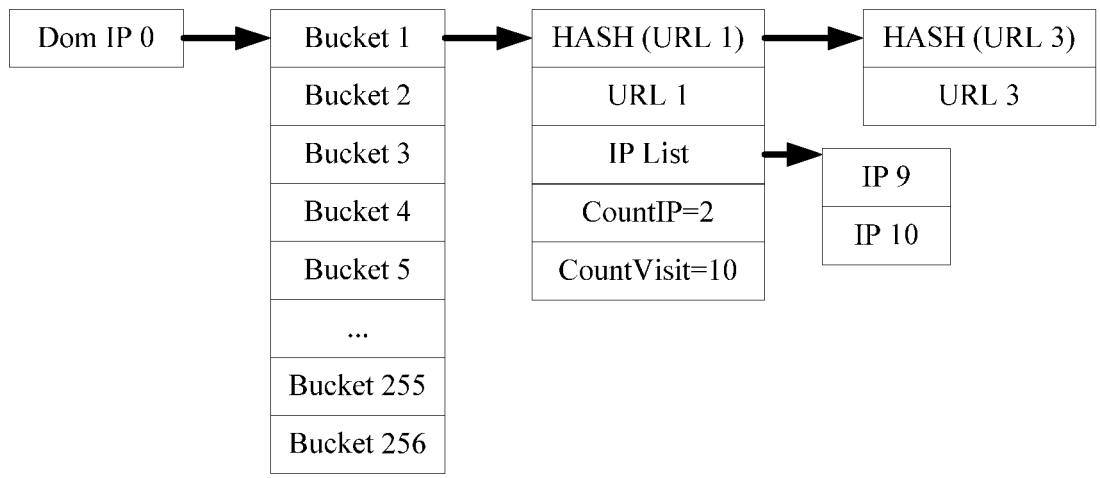
FIG. 9 is a schematic diagram of a web page visit record before a security device processes three access request packets, according to an embodiment.

The method shown in FIG. 8A and FIG. 8B is described by using, as an example, three different access request packets in the second web traffic: an HTTP request 1, an HTTP request 2, and an HTTP request 3. For brevity, only the form of "IP+identifier" is used to substitute for a specific 32-place binary address, and the form of "URL+identifier" is used to substitute for a specific URL character string. In this example, before the security device processes the three access request packets, a web page visit record that is constructed using the data structure shown in FIG. 7 is shown in FIG. 9. A URL 3 is a normal URL, and a total quantity of visits and an IP address list that are corresponding to a URL 2 are not saved. The security device is temporarily unable to tell whether a URL 1 is a suspicious URL or a normal URL, and therefore a total quantity of visits and an IP address list that are corresponding to the URL 1 are saved.

The security device parses the HTTP request 1, the HTTP request 2, and the HTTP request 3 to learn that the three access requests all have a destination address IP 0, which is the IP address of the protected host; that the HTTP request 1 carries a URL that is URL 1 and a source IP address that is IP 1; that the HTTP request 2 carries a URL that is URL 2 and a source IP address that is IP 2; and that the HTTP request 3 carries a URL that is URL 3 and a source IP address that is IP 3.

For the HTTP request 1, the hash table shown in FIG. 4 is searched for a bucket table corresponding to IP 0, and URLs saved in entries are compared with the URL 1 successively, to determine whether they are the same. In this example, the URL 1 is different from the URL 3 which is a normal URL, and the URL 1 has been recorded in the web page visit record, and therefore 1 is added to the recorded total quantity of visits to the URL 1, the source address IP 1 of the HTTP request 1 is added to an IP address visiting the URL 1, and 1 is added to the IP address count.

In this example, the URL 2 carried in the HTTP request 2 is different from the URL 3 which is a normal URL, and the URL 2 is not recorded in the web page visit record, and therefore an entry corresponding to the URL 2 is created in the web page visit record, the URL 2 is recorded in the created entry, a total quantity of visits to the URL 2 is set to 1, an IP address count is set to 1, and the source address IP 2 of the HTTP request 2 is recorded in an IP address list in the created entry.

Figure 10:
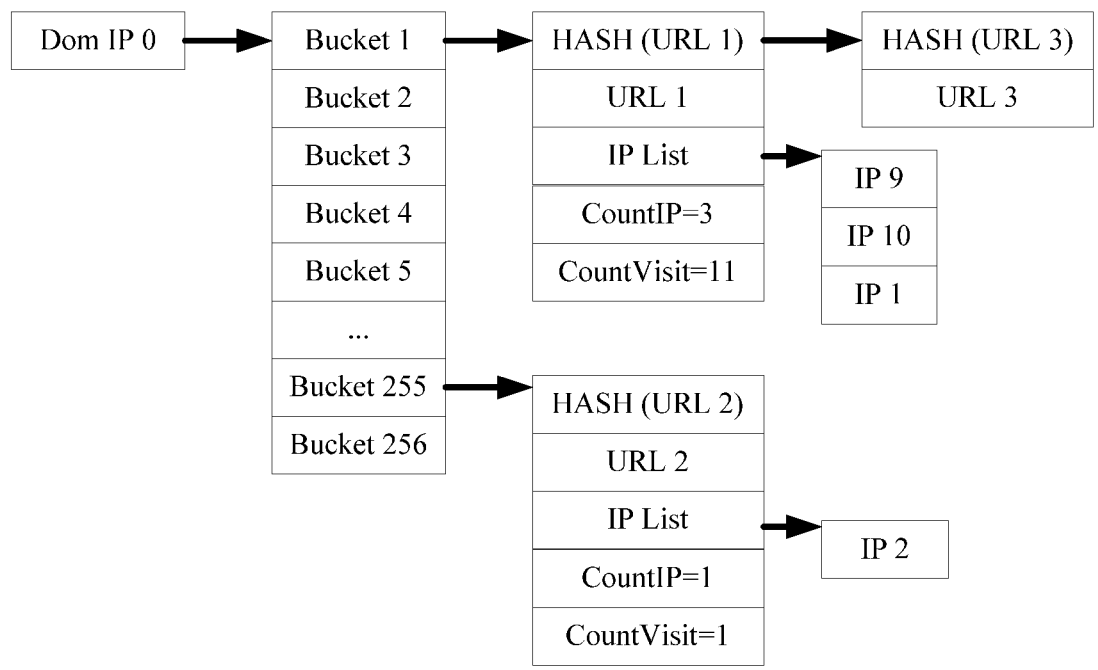
FIG. 10 is a schematic diagram of a web page visit record after a security device processes three access request packets, according to an embodiment of this application.

In this example, the URL 3 carried in the HTTP request 3 is the same as a normal URL, and processing on the HTTP request 3 ends. A web page visit record obtained after the three access requests are processed is shown in FIG. 10.

According to the foregoing processing, for a normal URL, the security device needs to save only a URL into the web page visit record, and for a URL corresponding to an additional web page or a URL pending to be a normal URL or a suspicious URL, an IP address of the pending URL and a total quantity of visits to the pending URL are saved. This helps determine later whether the pending URL is a normal URL or a suspicious URL, based on the recorded IP address of the pending URL and the recorded total quantity of visits to the pending URL. Therefore, it is ensured that the data volume of the web page visit record does not increase rapidly as the quantity of normal web pages grows quickly, and storage space is saved; and moreover, a newly appearing webshell file can be identified, thereby achieving a better identification effect.

Figure 11:
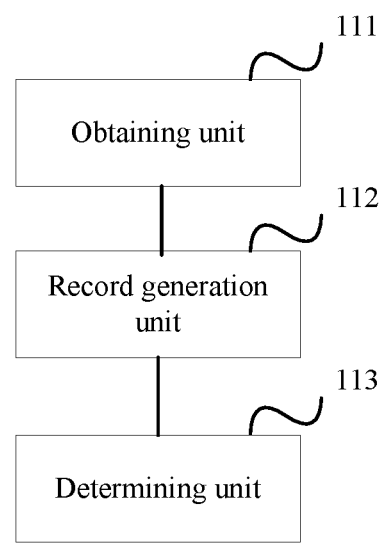
FIG. 11 is a schematic structural diagram of a webshell detection apparatus according to an embodiment of this application.

Correspondingly, the disclosed embodiments also provide a webshell detection apparatus. As shown in FIG. 11, the apparatus includes an obtaining unit 111, a record generation unit 112, and a determining unit 113. Details are as follows.

The obtaining unit 111 is configured to obtain first web traffic of a protected host, where the first web traffic is traffic generated when a web page provided by the protected host is visited during a first period.

The record generation unit 112 is configured to generate a web page visit record of the protected host based on the first web traffic obtained by the obtaining unit 111, where the web page visit record is used to save at least one uniform resource locator URL, an IP address visiting each of the at least one URL, and a total quantity of visits to each URL, and each URL identifies one web page provided by the protected host.

The determining unit 113 is configured to: determine a suspicious URL from the at least one URL based on the web page visit record generated by the record generation unit 112, where a total quantity of visits to the suspicious URL is less than a first threshold, and a ratio of a quantity of different IP addresses visiting the suspicious URL to the total quantity of visits to the suspicious URL is less than a second threshold; and determine whether a web page identified by the suspicious URL contains a webshell signature in a webshell signature database, and detect, based on a webshell signature determining result, whether a webshell exists in the web page identified by the suspicious URL.

Optionally, the web page visit record in this embodiment includes at least one entry, each of the at least one entry is corresponding to one of the at least one URL, and each entry saves a total quantity of visits and an IP address list. A structure of the entry is shown in FIG. 4.

The record generation unit is specifically configured to: obtain at least one access request packet from the first web traffic, where a destination IP address of the access request packet is an IP address of the protected host; and select one access request packet from the at least one access request packet, and perform the following processing on the selected access request packet, until each of the at least one access request packet is processed:

parsing the selected access request packet to obtain a source IP address of and a URL carried in the selected access request packet; searching the web page visit record for an entry corresponding to the URL carried in the selected access request packet; and if the entry corresponding to the URL carried in the selected access request packet is found, adding 1 to a total quantity of visits in the found entry, and recording the source IP address into an IP address list in the found entry; or if the entry corresponding to the URL carried in the selected access request packet is not found, creating, in the web page visit record, the entry corresponding to the URL carried in the selected access request packet, setting a total quantity of visits in the created entry to 1, and recording the source IP address into the IP address list in the created entry.

Correspondingly, the determining unit 113 is specifically configured to: select one entry from the web page visit record; determine a quantity of IP addresses different from one another in an IP address list in the selected entry; and if a total quantity of visits in the selected entry is less than the first threshold, and a ratio of the determined quantity of IP addresses different from one another to the total quantity of visits in the selected entry is less than the second threshold, determine a URL corresponding to the selected entry as the suspicious URL.

Optionally, the web page visit record includes at least one entry, each of the at least one entry is corresponding to one of the at least one URL, and the entry saves a total quantity of visits, an IP address count, and an IP address list. A structure of the entry is shown in FIG. 7.

The record generation unit 112 is specifically configured to: obtain at least one access request packet from the first web traffic, where a destination IP address of the access request packet is an IP address of the protected host; and
    select one access request packet from the at least one access request packet, and perform the following processing on the selected access request packet, until each of the at least one access request packet is processed:
    obtaining a source IP address of and a URL carried in the selected access request packet; searching the web page visit record for an entry corresponding to the URL carried in the selected access request packet; and if the entry corresponding to the URL carried in the selected access request packet is found, adding 1 to a total quantity of visits in the found entry; determining whether the source IP address has been saved in an IP address list in the found entry; and if the source IP address has been saved in the IP address list in the found entry, ending processing the selected access request packet; or if the source IP address has not been saved in the IP address list in the found entry, adding 1 to an IP address count in the found entry, and recording the source IP address into the IP address list in the found entry; or if the entry corresponding to the URL carried in the selected access request packet is not found, creating, in the web page visit record, the entry corresponding to the URL carried in the access request packet, setting a total quantity of visits in the created entry to 1, setting an IP address count in the created entry to 1, and recording the source IP address into the IP address list in the created entry.

Correspondingly, the determining unit 113 is specifically configured to: select one entry from the web page visit record; and if a total quantity of visits in the selected entry is less than the first threshold, and a ratio of an IP address count in the selected entry to the total quantity of visits in the selected entry is less than the second threshold, determine a URL corresponding to the selected entry as the suspicious URL.

Optionally, the record generation unit 112 selects at least one access response packet from the first web traffic, where a status code carried in each of the at least one access response packet indicates a successful visit, and a source address of each access response packet is the IP address of the protected host; and obtains a respective access request packet corresponding to each of the at least one web page access response packet from the first web traffic, as the obtained at least one access request packet.

Optionally, that the record generation unit 112 searches the web page visit record for an entry corresponding to the URL carried in the selected access request packet includes: performing at least one type of normalization processing on the URL carried in the selected access request packet, to obtain a normalization-processed URL, where the normalization processing includes one or more of the following (1) to (3): (1) converting the URL carried in the selected access request packet into a predetermined code scheme; (2) converting characters in the URL carried in the selected access request packet into a predetermined uppercase/lowercase type; and (3) removing a parameter in the URL carried in the selected access request packet; and searching the web page visit record for an entry corresponding to the normalization-processed URL.

That the record generation unit 112 creates, in the web page visit record, the entry corresponding to the URL carried in the access request packet is specifically: creating, in the web page visit record, the entry corresponding to the normalization-processed URL.

Optionally, the determining unit 113 is further configured to: determine a normal URL from the at least one URL based on the web page visit record, where the normal URL is a URL whose total quantity of visits is greater than the first threshold in the at least one URL or a suspicious URL for which a webshell detection result indicates that no webshell exists in an identified web page; and delete an IP address visiting the normal URL and a total quantity of visits to the normal URL that are saved in the web page visit record.

Optionally, the obtaining unit 111 is further configured to obtain second web traffic of the protected host, where the second web traffic is traffic generated when the web page provided by the protected host is visited during a second period after the first period.

Correspondingly, the record generation unit 112 is further configured to: obtain a first access request packet, a second access request packet, and a third access request packet from the second web traffic;

parse the first access request packet to obtain a source IP address of and a URL carried in the first access request packet; and if the URL carried in the first access request packet is different from the normal URL, and the URL carried in the first access request packet has been saved in the web page visit record, add 1 to a total quantity of visits to the saved URL carried in the first access request packet, and add the source IP address of the first access request packet to an IP address visiting the URL carried in the first access request packet;

parse the second access request packet to obtain a source IP address of and a URL carried in the second access request packet; and if the URL carried in the second access request packet is different from the normal URL, and the URL carried in the second access request packet has not been saved in the web page visit record, save the URL carried in the second access request packet into the web page visit record, set a total quantity of visits to the URL carried in the second access request packet to 1, and set an IP address visiting the URL carried in the second access request packet to the source IP address of the second access request packet; and parse the third access request packet to obtain a URL carried in the third access request packet; and if the URL carried in the third access request packet is the same as the normal URL, end processing the third access request.

The webshell detection apparatus provided in this apparatus embodiment may be integrated into a security device, and applied to the scenario shown in FIG. 1 of method Embodiment 1, so as to implement functions of the security device. The webshell detection apparatus may implement other auxiliary functions and interactive processes with other network element devices. For details, refer to descriptions of the security device in the method embodiment, and details are not repeated herein.

For same or similar parts in the disclosed embodiments, mutual reference may be made, and each embodiment focuses on what is different from other embodiments. Especially, the apparatus embodiment is essentially the same as the method embodiment, and therefore is described briefly; for related information, reference may be made to related descriptions in the method embodiment.

Various modifications and variations to the present invention can be made without departing from the scope of the present invention. The present invention is intended to cover these modifications and variations provided that they fall within the scope of protection defined by the following claims and their equivalent technologies.

What is claimed is:

1. A webshell detection method, comprising:

obtaining first web traffic of a protected host, wherein the first web traffic is traffic generated when a plurality of web page files provided by the protected host are visited during a first period;

generating a web page visit record of the protected host based on the first web traffic, wherein the web page visit record includes a uniform resource locator (URL) of each of the plurality of web page files, an IP address of each of a plurality of visitors visiting each of the plurality of web page files, and a total quantity of visits from the plurality of visitors to each of the plurality of web page files, wherein the generating further comprises performing at least one normalization processing operation on the URL;

determining a suspicious web page file from the plurality of web page files provided by the protected host, wherein the suspicious web page file is determined based on the total quantity of visits to the suspicious web page file from the plurality of visitors and a ratio between a quantity of different IP addresses of the plurality of visitors visiting the suspicious web page file and the total quantity of visits to the suspicious web page file from the plurality of visitors, wherein the total quantity of visits to the suspicious web page file from the plurality of visitors is less than a first threshold, and the ratio is less than a second threshold;

determining whether the suspicious web page file contains a webshell signature in a webshell signature database; and detecting, based on a webshell signature determining result, whether a webshell exists in the suspicious web page file.

2. The method according to claim 1, wherein the web page visit record comprises at least one entry, wherein each of the at least one entry corresponds to one of at least one URL, and includes a total quantity of visits and an IP address list; and wherein the generating the web page visit record of the protected host based on the first web traffic comprises:

obtaining at least one access request packet from the first web traffic, wherein a destination IP address of each of the at least one access request packet is an IP address of the protected host;

performing the following operations on each of the at least one access request packet:

parsing the access request packet to obtain a source IP address of and a URL included in the access request packet;

searching the web page visit record for an entry corresponding to the URL; and when the entry corresponding to the URL is found, adding 1 to a total quantity of visits in the found entry, and recording the source IP address into an IP address list in the found entry, or when the entry corresponding to the URL is not found, creating, in the web page visit record, an entry corresponding to the URL, and setting a total quantity of visits in the created entry to 1 and recording the source IP address into an IP address list in the created entry.

3. The method according to claim 1, wherein the web page visit record comprises at least one entry, wherein each of the at least one entry corresponds to one of at least one URL, and includes a total quantity of visits, an IP address count, and an IP address list; and
wherein the generating the web page visit record of the protected host based on the first web traffic comprises:
obtaining at least one access request packet from the first web traffic, wherein a destination IP address of each of the at least one access request packet is an IP address of the protected host;
performing the following operations on each of the at least one access request packet:
obtaining a source IP address of and a URL included in the access request packet;
searching the web page visit record for an entry corresponding to the URL included in the access request packet;
when the entry corresponding to the URL included in the access request packet is found,
adding 1 to a total quantity of visits in the found entry,
determining whether the source IP address has been saved in an IP address list in the found entry, and
ending processing the access request packet when the source IP address has been saved in the IP address list in the found entry, or adding 1 to an IP address count in the found entry and recording the source IP address into the IP address list in the found entry when the source IP address has not been saved in the IP address list in the found entry; or
when the entry corresponding to the URL included in the access request packet is not found, creating, in the web page visit record, an entry corresponding to the URL included in the access request packet, setting a total quantity of visits in the created entry to 1, setting an IP address count in the created entry to 1, and recording the source IP address into an IP address list in the created entry.

4. The method according to claim 2, wherein the obtaining the at least one access request packet from the first web traffic comprises:
selecting at least one access response packet from the first web traffic, wherein a status code included in each of the at least one access response packet indicates a successful visit, and a source address of each access response packet is the IP address of the protected host; and
obtaining an access request packet corresponding to each of the at least one web page access response packet from the first web traffic, as one of the at least one access request packet.

5. The method according to claim 2, wherein the searching the web page visit record for the entry corresponding to the URL included in the access request packet comprises:
wherein the at least one normalization processing operation comprises one or more of the following:
converting the URL into a predetermined code scheme, converting characters in the URL into a predetermined uppercase/lowercase type, and removing a parameter in the URL; and searching the web page visit record for an entry corresponding to the normalization-processed URL.

6. The method according to claim 3, wherein the obtaining the at least one access request packet from the first web traffic comprises:
selecting at least one access response packet from the first web traffic, wherein a status code included in each of the at least one access response packet indicates a successful visit, and a source address of each access response packet is the IP address of the protected host; and
obtaining an access request packet corresponding to each of the at least one web page access response packet from the first web traffic, as one of the at least one access request packet.

7. The method according to claim 1, further comprising:
determining a normal web page file from the plurality of web page files provided by the protected host based on the web page visit record, wherein the normal web page file is a web page file whose total quantity of visits is greater than the first threshold or a suspicious web page file for which a webshell detection result indicates that no webshell exists in association with the suspicious web page file; and
deleting an IP address of a visitor of one of the plurality of visitors visiting the normal web page file and a total quantity of visits to the normal web page file from the web page visit record.

8. The method according to claim 7, further comprising:
obtaining second web traffic of the protected host, wherein the second web traffic is traffic generated when the plurality of web page files provided by the protected host are visited during a second period after the first period;
obtaining a first access request packet, a second access request packet, and a third access request packet from the second web traffic;
parsing the first access request packet to obtain a source IP address of the first access request packet and a first URL included in the first access request packet;
adding 1 to a total quantity of visits to the first URL, and adding the source IP address of the first access request packet to an IP address visiting the first URL when the first URL is different from a URL corresponding to the normal web page file and has been saved in the web page visit record;
parsing the second access request packet to obtain a source IP address of the second access request packet and a second URL included in the second access request packet;
saving the second URL into the web page visit record, setting a total quantity of visits to the second URL to 1, and setting an IP address visiting the second URL to the source IP address of the second access request packet when the second URL is different form the URL corresponding to the normal web page file and has not been saved in the web page visit record;
parsing the third access request packet to obtain a third URL included in the third access request packet; and
ending processing the third access request packet when the third URL is the same as a URL corresponding to the normal web page file.

9. The webshell detection method of claim 1, wherein the webshell is a file stored in a web page directory of the protected host.

10. A security device, comprising:
a memory;

a processor;
a network interface; and
a bus;
wherein the memory, the processor, and the network interface are connected to each other by using the bus;
wherein the network interface is configured to obtain first web traffic of a protected host, wherein the first web traffic is traffic generated when a plurality of web page files provided by the protected host are visited during a first period; and
wherein the processor executes program code stored in the memory to perform operations comprising:
   generating a web page visit record of the protected host based on the first web traffic, wherein the web page visit record includes a uniform resource locator (URL) of each of the plurality of web page files, an IP address of each of a plurality of visitors visiting each of the plurality of web page files, and a total quantity of visits from the plurality of visitors to each of the plurality of web page files, wherein the generating further comprises performing at least one normalization processing operation on the URL;
   determining a suspicious web page file from the plurality of web page files provided by the protected host, wherein the suspicious web page file is determined based on the total quantity of visits to the suspicious web page file from the plurality of visitors and a ratio between a quantity of different IP addresses of the plurality of visitors visiting the suspicious web page file and the total quantity of visits to the suspicious web page file from the plurality of visitors, wherein the total quantity of visits to the suspicious web page file from the plurality of visitors is less than a first threshold, and the ratio is less than a second threshold;
   determining whether the suspicious web page file contains a webshell signature in a webshell signature database; and
   detecting, based on a webshell signature determining result, whether a webshell exists in the suspicious web page file.

11. The security device according to claim 10, wherein the web page visit record comprises at least one entry, wherein each of the at least one entry corresponds to one of at least one URL, and includes a total quantity of visits and an IP address list; and
wherein the operations further comprise:
   obtaining at least one access request packet from the first web traffic, wherein a destination IP address of each of the at least one access request packet is an IP address of the protected host,
   performing the following operations on each of the at least one access request packet:
      parsing the access request packet to obtain a source IP address of and a URL included in the access request packet,
      searching the web page visit record for an entry corresponding to the URL included in the access request packet,
      when the entry corresponding to the URL is found, adding 1 to a total quantity of visits in the found entry, and recording the source IP address into an IP address list in the found entry, or
      when the entry corresponding to the URL is not found, creating, in the web page visit record, an entry corresponding to the URL included in the access request packet, and setting a total quantity of visits in the created entry to 1, and recording the source IP address into an IP address list in the created entry.

12. The security device according to claim 10, wherein the web page visit record comprises at least one entry, wherein each of the at least one entry corresponds to one of the at least one URL, and includes a total quantity of visits, an IP address count, and an IP address list; and
wherein the operations further comprise:
   obtaining at least one access request packet from the first web traffic, wherein a destination IP address of each of the at least one access request packet is an IP address of the protected host;
   performing the following operations on each of the at least one access request packet:
      obtaining a source IP address of and a URL included in the access request packet;
      searching the web page visit record for an entry corresponding to the URL;
      when the entry corresponding to the URL is found, adding 1 to a total quantity of visits in the found entry,
         determining whether the source IP address has been saved in an IP address list in the found entry, and
         ending processing the access request packet when the source IP address has been saved in the IP address list in the found entry, or adding 1 to an IP address count in the found entry and recording the source IP address into the IP address list in the found entry when the source IP address has not been saved in the IP address list in the found entry; or
      when the entry corresponding to the URL is not found, creating, in the web page visit record, an entry corresponding to the URL, setting a total quantity of visits in the created entry to 1, setting an IP address count in the created entry to 1, and recording the source IP address into an IP address list in the created entry.

13. The security device according to claim 11, wherein the operations further comprise:
   selecting at least one access response packet from the first web traffic, wherein a status code included in each of the at least one access response packet indicates a successful visit, and a source address of each access response packet is the IP address of the protected host; and
   obtaining a respective access request packet corresponding to each of the at least one web page access response packet from the first web traffic, as one of the at least one access request packet.

14. The security device according to claim 11, searching the web page visit record for an entry corresponding to the URL included in the access request packet comprise:
   wherein the at least one normalization processing operation comprises one or more of the following:
   converting the URL into a predetermined code scheme, converting characters in the URL into a predetermined uppercase/lowercase type, and removing a parameter in the URL; and
   searching the web page visit record for an entry corresponding to the normalization-processed URL.

15. The security device according to claim 10, wherein operations further comprise:
   determining a normal web page file from the plurality of web page files provided by the protected host based on the web page visit record, wherein the normal web page file is a web page file whose total quantity of visits is greater than the first threshold or a suspicious web page file for which a webshell detection result indicates that no webshell exists in association with the suspicious web page file; and deleting an IP address of a visitor of one of the plurality of visitors visiting the normal web page file and a total quantity of visits to the normal web page file from the web page visit record.

16. The security device according to claim 15, wherein the operations further comprise:

obtaining second web traffic of the protected host, wherein the second web traffic is traffic generated when the plurality of web page files provided by the protected host are visited during a second period after the first period;

obtaining a first access request packet, a second access request packet, and a third access request packet from the second web traffic;

parsing the first access request packet to obtain a source IP address of the first access request packet and a first URL included in the first access request packet;

adding 1 to a total quantity of visits to the first URL and adding the source IP address of the first access request packet to an IP address visiting the first URL when the first URL is different from a URL corresponding to the normal web page file and has been saved in the web page visit record;

parsing the second access request packet to obtain a source IP address of the second access request packet and a second URL included in the second access request packet;

saving the second URL into the web page visit record, set a total quantity of visits to the second URL to 1, and set an IP address visiting the second URL to the source IP address of the second access request packet when the second URL is different from the URL corresponding to normal web page file and has not been saved in the web page visit record;

parsing the third access request packet to obtain a third URL included in the third access request packet; and ending processing the third access request packet when the third URL is the same as a URL corresponding to the normal web page file.

17. The security device of claim 10, wherein the webshell is a file stored in a web page directory of the protected host.

* * * * *